March 13, 1956 F. UTZ 2,737,985
GUARDS FOR MOTOR HAND SAWS
Filed April 22, 1952

Inventor:
Friedrich Utz
By
Young, Emery & Thompson
Attys.

United States Patent Office 2,737,985
Patented Mar. 13, 1956

2,737,985

GUARDS FOR MOTOR HAND SAWS

Friedrich Utz, Aistaig (Neckar), Wurttemberg, Germany

Application April 22, 1952, Serial No. 283,615

Claims priority, application Germany May 2, 1951

2 Claims. (Cl. 143—159)

This invention relates to a motor hand saw for sawing wood.

It is an object of the invention to provide a motor-driven hand saw with a protecting cover or shield for the lower or exposed part of the disc saw blade and which is rotatably mounted on the axis of a driving motor for the saw disc. A further object of the invention resides in the provision of a handle lever operatively connected to a part of the protecting cover to rotate the latter from a position of complete protection and guard over the exposed saw disc to one in which the cover is rotated out of the protecting position to one permitting free use of the saw blade.

A still further object of the invention resides in the provision of spring means connected to the handle lever to force the latter to a position in which the cover is completely protecting and surrounding the exposed portion of the saw disc.

Another object of the invention resides in the provision of a portable hand power saw having two handles for manipulating the saw, one of the handles being movable and connected to a protecting cover to move the latter out of its protecting position into one which permits use of the saw blade. A further object of the invention resides in the provision of two protecting covers, one of which is stationary and the other of which is movable into the confines of the stationary cover.

Further objects will be apparent from the following description when considered in connection with the accompanying drawing in which.

Figure 2:
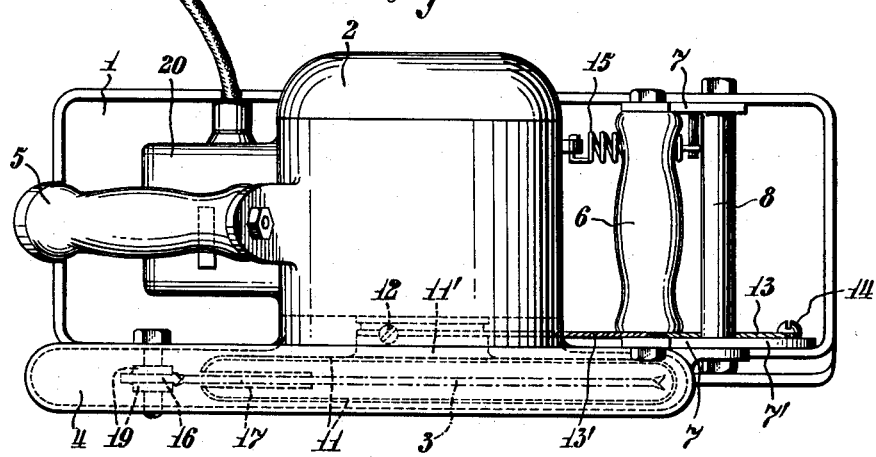
Fig. 2 is a top plan view of the sawing machine.

The sawing machine consists of a base plate 1 forming a main frame on which is suitably mounted a motor 2. A disc saw 3 is mounted to rotate with a motor shaft 9 to which it is suitably secured. An upper protecting hood 4 is secured to the motor housing and to the base plate 1. A rear handle member 5 is secured to the motor housing and to the base plate 1, and a front handle 6 is mounted on a pair of double levers 7 pivoted on an axle 8. As shown in Fig. 2, the handles 5 and 6 are mounted so that they are at right angles to each other. The axle 8 is mounted on a horizontal axis which is parallel to the base plate 1. It is, of course, obvious that the handle member 6 may be mounted to slide in suitable guides, not shown.

A lower or bottom protecting hood 11 is rotatably mounted on the saw disc shaft 9 by means of a collar member 10. This bottom protecting hood 11 swings in the direction of the arrow in Fig. 1, that is in the sawing direction so that in the position shown in Fig. 1 the hood 11 fully protects the part of the saw disc which rotates from under the upper hood 4, but is swingable by rotation to a position within the hood 4 to expose the saw disc to permit the latter to function. The hood 11 is controlled in its open and closed positions by means of a wire cable 13 fastened at one end to the handle 6 at 14', is wrapped around the collar surface 11' and the other end of the cable is secured to the lower end part 7' of the lever 7 at 14. The cable is also secured to the collar at 12 by means of a screw to prevent slippage of the cable on the collar surface. The cable passes through suitable holes or slots in the housing of the motor. The part 7' is, of course, an extended part of the lever 7 and thus the lever 7, 7' is a double lever rotatable around the axle 8. As clearly shown in Fig. 1, the cable 13 crosses so that the underpart of the cable on the collar or hub 10 extends upwardly as a section 13' to the handle 6 at 14', and thus a greater portion of the collar is in contact with the cable. A tension spring 15 is connected at one end to the housing 2 and the other end to the lever 7, 7' to constantly urge the lever to move counterclockwise to close the lower hood 11 when the hand releases the handle 6. The dotted line position of the lever 7, 7' shows the position of the parts when the lower hood is in the open position.

Figure 1:
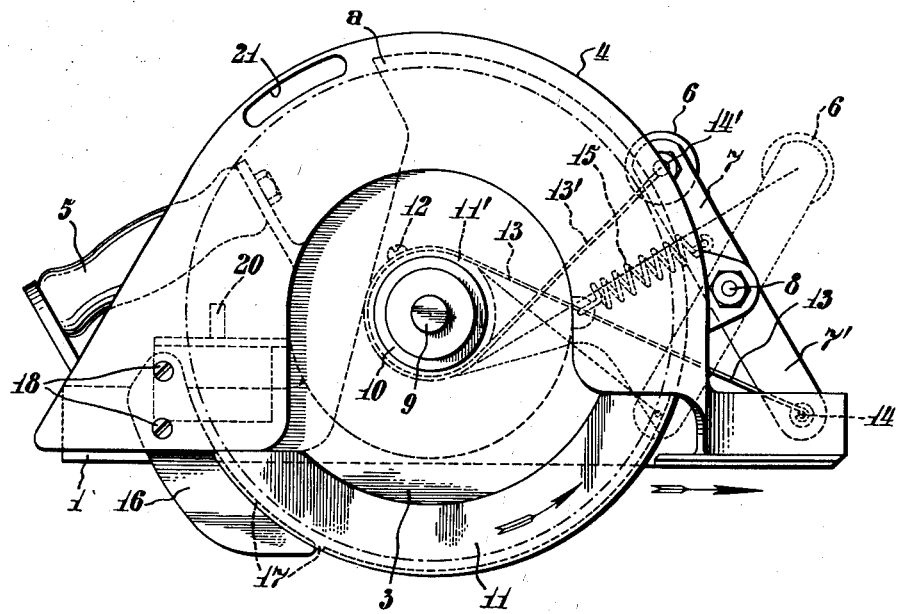
Figure 1 is a side elevation of the sawing machine.

Fig. 1 shows the direction of rotation of the circular saw and the sawing direction or the movement of the tool, by means of arrows. When using the sawing machine, the operator grasps the machine in both hands by means of handle grips 5 and 6 and with the front part of the base plate on the wood to be sawed upon moving the machine in the sawing direction, the handle 6 will immediately move forward or to the right. This will result in the swinging of the hood 11 counterclockwise to open the saw and expose it to the wood. The hood 11 moves up into the outer hood 4 and this is accomplished by the cable 13. Upon completion of the sawing operation and the operator releasing his hand from the handle 6, the latter with the lever 7, 7' and the hood 11 will be moved back to the non-sawing positions as shown in Fig. 1.

The sawing machine may be provided with a splitting wedge member 16 secured to the upper hood 4 and for this purpose the lower hood 11 is provided with a slot 17 into which the member 16 may project in the protected position of the hood 11. The member 16 is adjustably secured in the upper hood by means of a pair of screws or bolts 18 provided with nuts 19, one on each side of the member 16 to adjust the latter relative to the saw disc 3.

On the base plate 1 and just below the handle 5 there is provided a switch casing 20 so that the motor may be conveniently turned off and on by a finger of the operator. The switch controlling the motor may be provided under the handle 6 if desired, or the switch may be connected to operate by the swinging lever 7 so that the motor may be controlled by movement of the handle 6 such as after the opening of the hood 11 the motor may be turned on.

The hood 4 may be provided with one or more openings such as the one shown at 21 in Fig. 1, so that the sawdust which tends to rotate with the rotating blade will be thrown tangentially from the housing or hood 4.

It is of course possible to make many changes in the structure. For instance, in place of the cable 13, it would be possible to use a tension screw spring, not shown. It would also be possible to apply the invention to a saw machine in which the circular saw may be raised or lowered relative to the bottom plate and the saw blade may be adjusted at an angle relative to the vertical plane. Also if it is desired the hood 11 may also be provided with means movable by the handle 6 so that the hood 11 may be rotated a counterdirection relative to the direction of rotation of the circular saw 3.

From the foregoing it will be apparent this invention will prevent accidents in that the movement of the movable protecting cover is accomplished mechanically and not by direct manual contact with the cover. The structure of this invention produces a very safe tool which is quite fool proof and which operates most efficiently.

I claim:

1. A portable power saw comprising a base plate, a circular saw and motor mounted on said plate, a rear handle member connected to the plate and the motor, a stationary upper guard mounted over the circular saw, a lower guard movably mounted under the circular saw, a movably mounted front handle member including a lever pivotally mounted intermediate its ends, and means including a cable connected to the lower guard and the lever at the top and bottom ends thereof, said front handle member being automatically operable to move the lower guard out of its protecting position when the saw is moved in the sawing direction by gripping both handle members one in each hand of the operator and moving the front handle member away from the rear handle member in the sawing direction, and the top end of the lever having a hand grip secured thereon.

2. A portable power driven circular saw machine comprising a frame, a motor and saw secured on a mid part of the frame, a stationary guard mounted over a portion of the periphery of the saw, a movable guard for the remaining periphery of the saw and movable to and from the exposed and unexposed positions of a portion of the periphery of the saw, a stationary handle secured to the frame at one side of the motor, and a pivotally mounted handle mounted on the frame on the other side of the motor and saw in spaced relation relative to the stationary handle and having means connected to the movable guard to adjust the latter to the exposed and unexposed positions of the saw, each handle being capable to be gripped by a hand of the operator so that when both handles are gripped and the pivotally mounted handle is moved in a direction away from the stationary handle and in the sawing direction the pivotally mounted handle will move the movable guard to the exposed position for the saw.

References Cited in the file of this patent

UNITED STATES PATENTS

| | | |
|---|---|---|
| 1,102,018 | Dodds | June 30, 1914 |
| 1,738,896 | Hansen | Dec. 10, 1929 |
| 1,740,074 | Crowe | Dec. 17, 1929 |
| 2,342,052 | Jimerson et al. | Feb. 15, 1944 |